US011017553B2

(12) United States Patent
Nasu (10) Patent No.: US 11,017,553 B2
(45) Date of Patent: *May 25, 2021

(54) INFORMATION PROCESSING SYSTEM (71) Applicant: NEC CORPORATION, Tokyo (JP)

(72) Inventor: Yasuyuki Nasu, Tokyo (JP)

(73) Assignee: NEC CORPORATION, Tokyo (JP)

(*) Notice: Subject to any disclaimer, the term of this patent is extended or adjusted under 35 U.S.C. 154(b) by 86 days.

This patent is subject to a terminal disclaimer.

(21) Appl. No.: 16/425,332

(22) Filed: May 29, 2019

(65) Prior Publication Data

US 2019/0370993 A1 Dec. 5, 2019

(30) Foreign Application Priority Data

May 30, 2018 (JP) .............................. JP2018-103478

(51) Int. Cl.
G06T 7/70 (2017.01)
G06K 9/00 (2006.01)
G08G 1/017 (2006.01)
G06K 9/62 (2006.01)

(52) U.S. Cl.
CPC ............ G06T 7/70 (2017.01); G06K 9/00785 (2013.01); G06K 9/6261 (2013.01); G08G 1/0175 (2013.01); G06T 2207/10004 (2013.01)

(58) Field of Classification Search
CPC combination set(s) only.
See application file for complete search history.

(56) References Cited

U.S. PATENT DOCUMENTS

| 8,698,895 | B2* | 4/2014 | Nerayoff ................ G08G 1/017 348/148 |
| 2014/0257943 | A1* | 9/2014 | Nerayoff ............ H04N 5/23296 705/13 |
| 2014/0320645 | A1* | 10/2014 | Schmitz .................. G01S 13/92 348/142 |
| 2015/0281568 | A1* | 10/2015 | Kamada ............. H04N 5/23222 348/207.1 |
| 2015/0307048 | A1* | 10/2015 | Santora .................. G08G 1/205 348/148 |
| 2016/0009225 | A1* | 1/2016 | Watanabe ............... B60R 11/04 348/148 |
| 2016/0152211 | A1* | 6/2016 | Owens .................... B60R 25/31 348/36 |
| 2016/0282127 | A1* | 9/2016 | Goto ...................... G01S 5/0027 |
| 2016/0379350 | A1* | 12/2016 | Matsui .................... G06T 7/001 348/125 |

(Continued)

FOREIGN PATENT DOCUMENTS

JP 2003-295951 A 10/2003

Primary Examiner — Tsung Yin Tsai (57) ABSTRACT

An information processing system of the present invention includes: a specifying unit configured to specify, based on a shot image, position information representing a position of a moving object present in the shot image and identification information for identifying a section of an area where the moving object is located; and a transmitting unit configured to transmit the position information and the identification information to the outside in association with each other. The moving object includes an estimating unit 130 configured to estimate a position of the moving object based on the identification information and the position information that have been transmitted.

11 Claims, 5 Drawing Sheets

(56) References Cited

U.S. PATENT DOCUMENTS

| | | | |
|---|---|---|---|
| 2017/0166131 A1* | 6/2017 | Oba | B60R 1/002 |
| 2018/0343373 A1* | 11/2018 | Satou | G06K 9/00845 |
| 2019/0009785 A1* | 1/2019 | Lawrenson | G01S 17/66 |
| 2019/0026959 A1* | 1/2019 | Wu | G05D 1/0297 |
| 2019/0257659 A1* | 8/2019 | Moteki | G06T 7/73 |
| 2019/0373218 A1* | 12/2019 | Nasu | G06T 7/70 |
| 2020/0242922 A1* | 7/2020 | Dulberg | G08G 1/08 |

* cited by examiner

INFORMATION PROCESSING SYSTEM

INCORPORATION BY REFERENCE

This application is based upon and claims the benefit of priority from Japanese patent application No. 2018-103478, filed on May 30, 2018, the disclosure of which is incorporated herein in its entirety by reference.

TECHNICAL FIELD

The present invention relates to an information processing system, an information processing device, a program, and an information processing method.

BACKGROUND ART

In recent years, an autonomous traveling vehicle that autonomously travels is used in various situations. For example, an autonomous mobile robot actively works, such as moves on a set route in a factory to carry a package, or moves on a set route to provide security. It is important for such a moving object to recognize its own position so as to move on an appropriate route.

In order for a moving object to recognize its own position as described above, for example, a camera or a sensor is mounted on the moving object. Moreover, for example, a camera is fixedly placed not on a moving object but in a predetermined place and the position of an autonomous moving object is determined based on a video from the camera as described in Patent Document 1. According to the technique of Patent Document 1, a moving object does not need to be equipped with sensors such as cameras, so that the equipment cost can be saved.

Patent Document 1: Japanese Unexamined Patent Application Publication No. JP-A 2003-295951

However, the technique described above cannot clarify correspondence between a moving object shown in an image and a moving object that is actually moving. Therefore, it is difficult to more accurately specify the position of a moving object.

SUMMARY OF THE INVENTION

An object of the present invention is to solve the above-mentioned problem that it is difficult to more accurately specify the position of a moving object at low cost.

An information processing system as an aspect of the present invention includes: a specifying unit configured to specify, based on a shot image, position information representing a position of a moving object present in the shot image and identification information for identifying a section of an area where the moving object is located; and a transmitting unit configured to transmit the position information and the identification information to outside in association with each other. The moving object includes an estimating unit configured to estimate a position of the moving object based on the identification information and the position information that have been transmitted.

Further, an information processing device as another aspect of the present invention includes: a specifying unit configured to specify, based on a shot image, position information representing a position of a moving object present in the shot image and identification information for identifying a section of an area where the moving object is located; and a transmitting unit configured to transmit the position information and the identification information to surroundings in association with each other so that the moving object can receive.

Further, a non-transitory computer-readable medium for storing a program as another aspect of the present invention includes instructions for causing an information processing device to realize: a specifying unit configured to specify, based on a shot image, position information representing a position of a moving object present in the shot image and identification information for identifying a section of an area where the moving object is located; and a transmitting unit configured to transmit the position information and the identification information to surroundings in association with each other so that the moving object can receive.

Further, an information processing method as another aspect of the present invention includes: in an information processing device, based on a shot image, specifying position information representing a position of a moving object present in the shot image and identification information for identifying a section of an area where the moving object is located, and transmitting the position information and the identification information to surroundings in association with each other; and in the moving object, estimating a position of the moving object based on the identification information and the position information that have been transmitted.

With the configurations as described above, the present invention makes it possible to more accurately specify the position of a moving object at low cost.

EXAMPLE EMBODIMENT

First Example Embodiment

Figure 1:
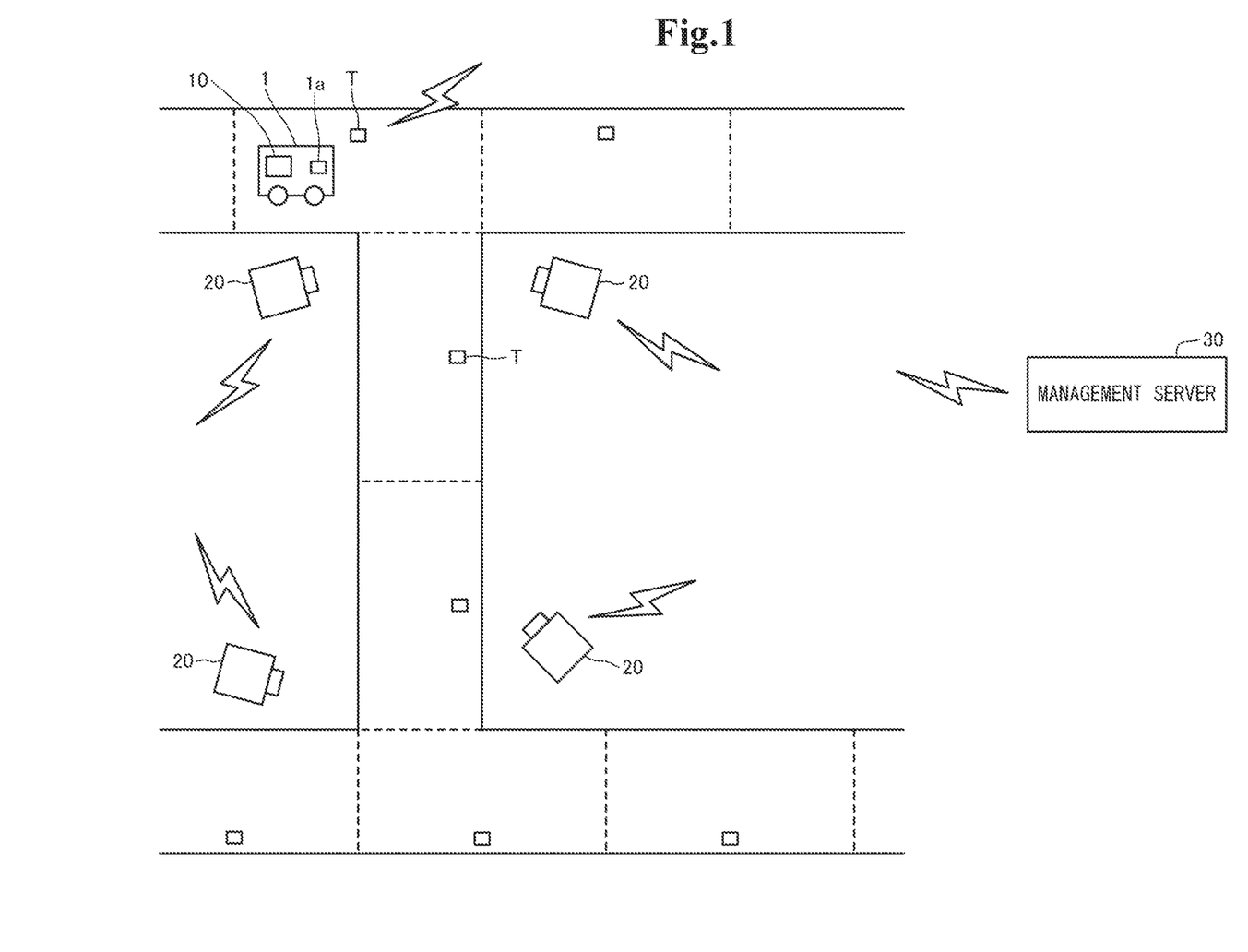
FIG. 1 is a schematic diagram showing an entire configuration of an information processing system according to a first example embodiment of the present invention.
Figure 2:
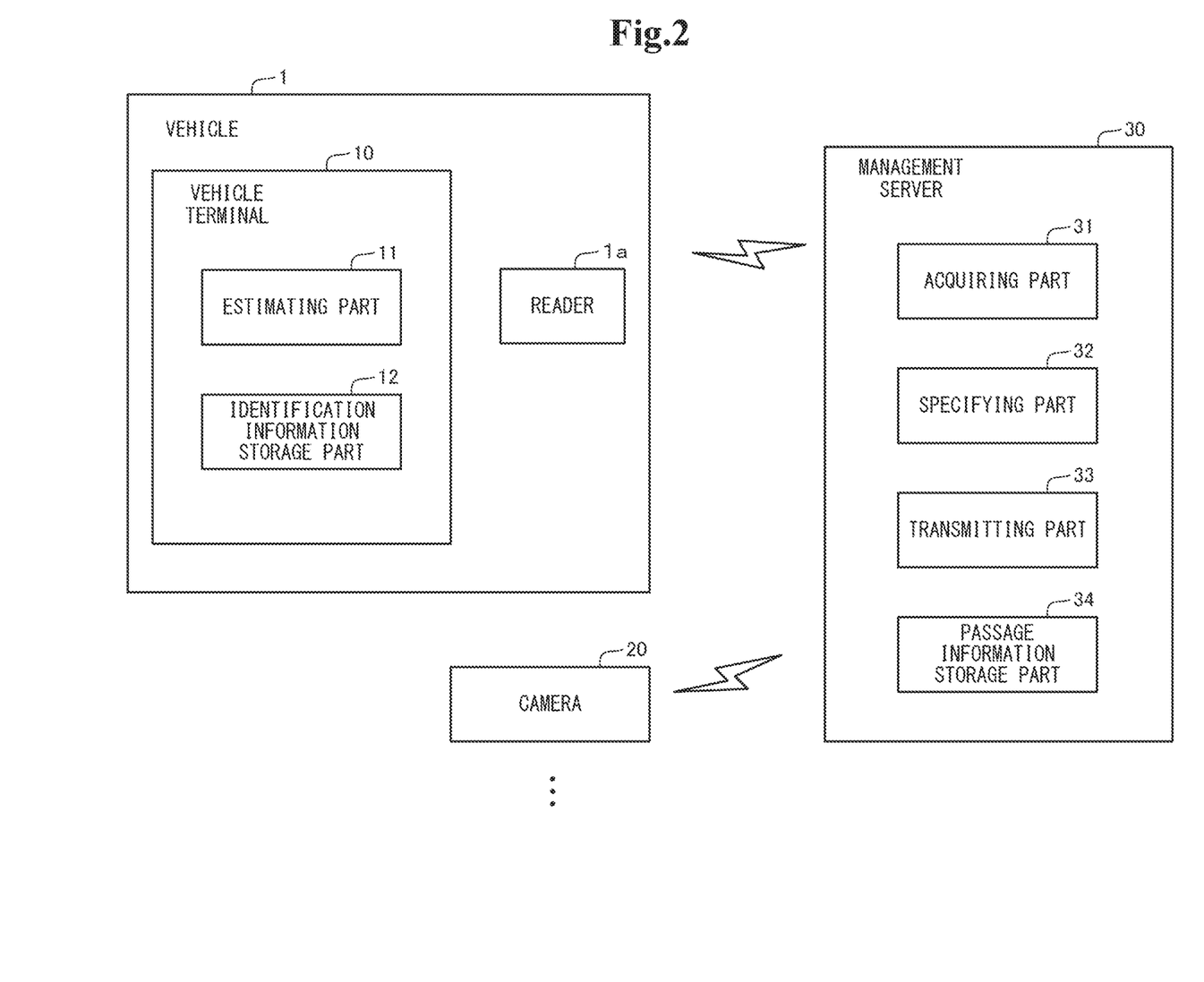
FIG. 2 is a block diagram showing the configuration of the information processing system disclosed in FIG. 1.
Figure 3:
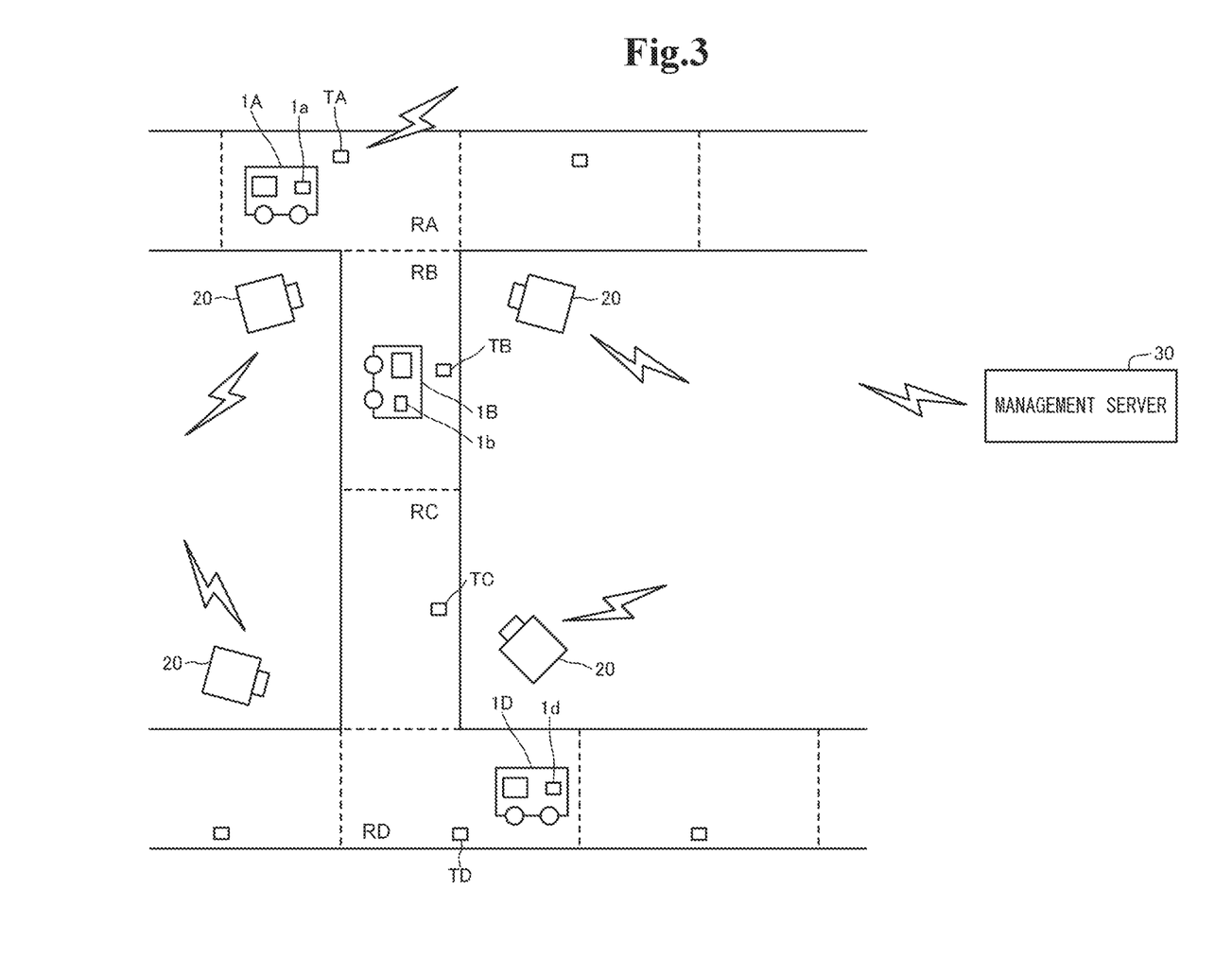
FIG. 3 is a diagram showing the traveling status of a vehicle in the information processing system disclosed in FIG. 1.
Figure 4:
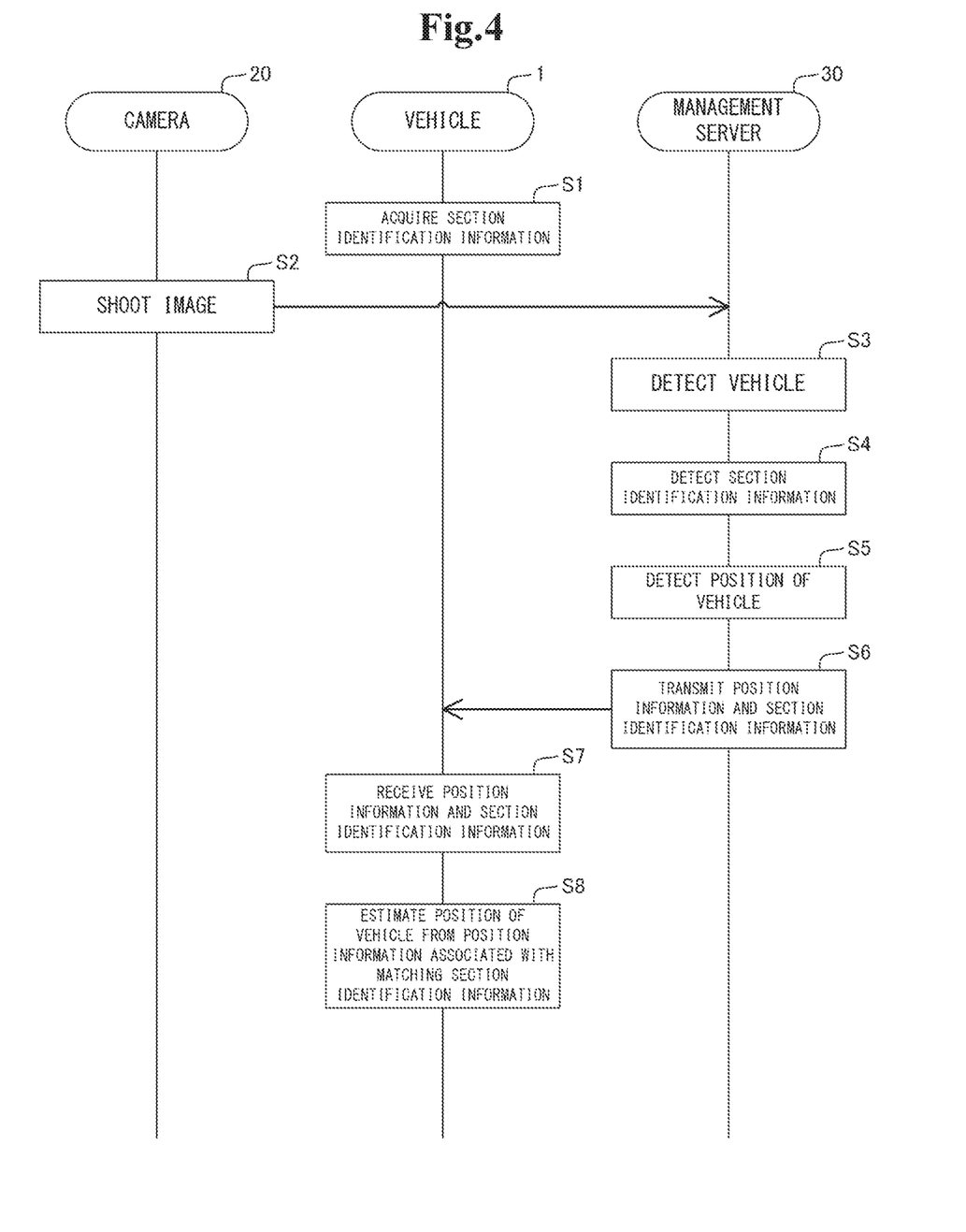
FIG. 4 is a sequence diagram showing the operation of the information processing system disclosed in FIG. 1.

A first example embodiment of the present invention will be described with reference to FIGS. 1 to 4. FIGS. 1 to 2 are diagrams for describing the configuration of an information processing system. FIGS. 3 to 4 are diagrams for describing the operation of the information processing system.

[Configuration]

The information processing system according to the present invention is a system for making a vehicle 1 (a moving object) recognize the position of the vehicle 1 itself. The vehicle 1, in order to convey a package or provide security in a predetermined site such as a factory, autonomously travels on a passage in the site. Therefore, as will be described later, the vehicle 1 has a function of recognizing its own position, and also has a function of determining a traveling route based on its own position having been recognized and autonomously traveling by automatic driving. However, the vehicle 1 is not limited to one that travels autonomously, and may be a moving object that travels by driving operation by a boarding driver or an operator who is in a remote place. For example, the vehicle 1 may be a cart traveling in a predetermined site by a person's operation or an automobile traveling on a general road.

As shown in FIG. 1, the information processing system in this example embodiment includes the vehicle 1, a camera 20, and a management server 30. The respective components will be described in detail below.

A plurality of cameras 20 are each placed beside a passage or on a passage so as to be able to shoot an image of a predetermined area of the passage. For example, the cameras 20 are each placed on a telephone pole, a traffic signal, a guard rail, a fence, and so on, placed beside a passage. Moreover, the cameras 20 are each placed so as to use a partial area of the passage as a shooting range. By combining the imaging ranges of the cameras 20, it becomes possible to shoot an image of the whole area of the passage. Camera identification information corresponding to its placement position or a shooting area of the passage is given to each of the cameras 20 and is stored in a storage unit provided in the camera 20.

The camera 20 acquires a shot image of the passage at a predetermined frame rate under control by an arithmetic logic unit installed therein. Then, the camera 20 transmits the acquired shot image together with camera identification information given to the camera 20 itself to the management server 30 under control by the arithmetic logic unit. The camera 20 is connected to the management server 30 via a wireless communication network or a wired communication network.

The management server 30 is an information processing device including an arithmetic logic unit and a storage unit, and can communicate with an external camera or information processing device via a network. The management server 30 includes an acquiring part 31, a specifying part 32 and a transmitting part 33 that are built by execution of a program by the arithmetic logic unit as shown in FIG. 2. Moreover, the management server 30 includes a passage information storage part 34 formed in the storage unit.

On the passage information storage part 34, a passage image obtained by previously shooting a passage is stored. The passage image is provided with camera identification information of the camera 20 having shot the passage image. Moreover, the passage image is stored in association with position information for each area on the passage image. For example, in a passage image, position information is associated with the shape of a passage and the feature value of an object for each area on the passage image. However, not only the abovementioned passage image but any information for specifying position information of each area on a shot image may be stored on the passage information storage part 34.

The acquiring part 31 (a specifying unit) acquires a shot image transmitted from each of the cameras 20 as described above. The acquiring part 31 performs image processing on the shot image and detects the vehicle 1 present in the shot image. For example, the acquiring part 31 previously retains information (a feature value such as color and shape) representing a feature on an image of the vehicle 1, and detects the vehicle 1 by confirming whether or not such a feature value is present in the shot image. Furthermore, the acquiring part 31 detects and acquires section identification information for identifying a section where a vehicle has been detected in a site, based on a shot image. To be specific, the acquiring part 31 detects section identification information of a section where the vehicle 1 is located in the following manner.

First, a passage in a facility is divided into a plurality of sections as shown with dotted lines in FIGS. 1 and 3. For example, as shown in FIG. 3, the passage is divided into sections RA to RD. Each of the sections is formed so that only one vehicle 1 can be located. For example, each of the sections is formed so that only one vehicle 1 can be located by setting a traveling function so that the vehicles 1 do not come close to each other within a preset distance.

Then, an RFID tag T is placed within each of the sections. The RFID tag T retains section identification information for identifying a section where the tag is placed. The RFID tag T is, for example, placed in the center of the section and configured to transmit the retained section identification information by near field communication only within the tag placement section. Moreover, to the outer surface of the RFID tag T, a QR code to which the section identification information of the placement section of the RFID tag T is assigned is given. The acquiring part 31 performs a recognition process on a QR code included in an image portion around the position of the vehicle 1 within a shot image and located the closest to the vehicle 1, and thereby detects the section identification information assigned to the QR code. Consequently, it is possible to detect the section identification information for identifying the section where the detected vehicle 1 is located.

However, the acquiring part 31 is not necessarily limited to detecting section identification information from a QR code. For example, the acquiring part 31 may detect section identification information of a section from an image feature value of another object placed in the section. Moreover, in a case where the camera 20 sets only one section as a shooting range, the acquiring part 31 may detect section identification information associated with camera identification information associated with a shot image transmitted from the camera 20, from the camera identification information.

The specifying part 32 (a specifying unit) performs image processing on a shot image transmitted from each of the cameras 20 and specifies position information representing the position of the vehicle 1 present in the shot image. For example, the specifying part 32 specifies position information representing a more detailed position within a section where the vehicle 1 is located. For example, the specifying part 32 specifies position information of the vehicle 1 based on a shot image showing the vehicle 1 in which vehicle identification information has been detected by the acquiring part 31 described above and based on a passage image stored on the passage information storage part 34.

To be specific, the specifying part 32 first extracts camera identification information associated with a shot image from which vehicle identification information has been detected, and acquires a passage image with which identical camera identification information is associated, from the passage image storage part 34. Then, the specifying part 32 extracts the shapes of roads and the features of other objects in the shot image and the passage image, and associates matching areas in images each other between the shot image and the passage image. After that, the specifying part 32 assigns, as position information of an area in which the vehicle 1 is located in the shot image, position information of the area in the passage image having been associated. However, the specifying part 32 may specify position information representing the position of the vehicle 1 in a shot image by any method.

As described above, the transmitting part 33 (a transmitting unit) transmits section identification information and position information of a section where the vehicle 1 present in a shot image is located, which have been acquired from the shot image, to the outside in association with each other. In particular, the transmitting part 33 transmits the section identification information and the position information so that the vehicle 1 located in a site where the vehicle 1 can travel can receive from an access point (not shown in the drawings) placed in the site. However, the transmitting part 33 may transmit the section identification information and the position information within a wider range.

Next, the configuration of the vehicle 1 will be described. The vehicle 1 is equipped with a vehicle terminal 10 as shown in FIG. 2. The vehicle terminal 10 is an information processing terminal including an arithmetic logic unit and a storage unit, and can communicate with an external information processing device by wireless communication. The vehicle terminal 10 includes an estimating part 11 built by execution of a program by the arithmetic logic unit. The vehicle terminal 10 also includes an identification information storage unit 12 formed in the storage unit. Furthermore, the vehicle 1 includes a reader 1a that performs near field communication with an RFID tag and reads information transmitted from the RFID tag.

The identification information storage part 12 retains section identification information read by the abovementioned reader 1a. The identification information storage part 12 updates and retains section identification information every time the reader 1a reads section identification information, and retains only section identification information having been read the latest.

Upon receiving mutually associated section identification information and position information transmitted from the transmitting part 33 of the management server 30 as described above, the estimating part 11 (an estimating unit) estimates position information representing the position of itself, namely, the vehicle 1 from the above information. To be specific, the estimating part 11 checks whether or not the transmitted section identification information and the section identification information stored on the identification information storage part 12 match and, when they match, estimates the position information associated with the transmitted section identification information as the position of the vehicle 1. The estimating part 11 may estimate the transmitted position information as the position of the vehicle 1 as it is, or may estimate the position of the vehicle 1 by using other information from the transmitted position information.

[Operation]

Next, the operation of the above-described information processing system will be described with reference to FIGS. 3 to 4 mainly. Herein, a case where a plurality of vehicles 1A, 1B and 1D are traveling within a target facility as shown in FIG. 3 will be described as an example.

First, a passage within a facility is divided into a plurality of sections RA to RD, and RFID tags TA to TD are placed within the respective sections. Each of the RFID tags TA to TD retains section identification information for identifying a section where the tag is placed, and transmits the section identification information to the surroundings by near field communication at constant time intervals. Moreover, to the outer surface of each of the RFID tags TA to TD, a QR code to which section identification information of a section where the RFID tag is placed is assigned is given.

Further, the vehicles 1A, 1B and 1D are provided with readers 1a, 1b and 1d, respectively. The respective vehicles 1A, 1B and 1D cause the readers 1a, 1b and 1d to read section identification information stored on the RFID tags TA to TD placed in the sections RA to RD of the passage at predetermined time intervals. At this time, each of the RFID tags TA to TD is configured to transmit section identification information only within a section where the tag is placed, so that each of the readers 1a, 1b and 1d of the vehicles 1A, 1B and 1D receives section identification information assigned to a section where the vehicle itself is located. Then, each of the vehicles 1A, 1B and 1D stores the latest section identification information having been received into the identification information storage part 12 (step S1). Consequently, each of the vehicles 1A, 1B and 1D retains only section identification information assigned to a section where the vehicle itself is located.

Each of the cameras 20 placed in the target facility acquires a shot image of a passage at predetermined time intervals. Then, the camera 20 transmits the shot image together with camera identification information set in the camera 20 itself to the management server 30 (step S2).

The management server 30, upon acquiring the shot images transmitted from the respective cameras 20, performs image processing on the respective shot images and detects the vehicles 1A, 1B and 1D present in the respective shot images (step S3). Then, the management server 30 performs a recognition process on a QR code included by an image portion of a section where the detected vehicle 1A, 1B, 1D is located, and then detects section identification information assigned to the QR code (step S4).

Furthermore, the management server 30 performs image processing on the shot image and specifies position information representing the position of the vehicle 1A, 1B, 1D present in the shot image (step S5). At this time, by comparing the shot image with previously stored passage images, the management server 30 specifies position information of the vehicle 1A, 1B, 1D. For example, the management server 30 first extracts camera identification information associated with the shot image from which the vehicle 1A, 1B, 1D has been detected, and acquires a passage image with which identical camera identification information is associated, from the passage image storage part 34. Then, the management server 30 extracts the shapes of roads or the features of other objects shown in the shot image and the passage image, and associates matching areas in images with each other between the shot image and the passage image. Furthermore, the management server 30 assigns and specifies, as position information of an area where the vehicle 1 is located within the shot image, position information in a passage image associated with the area.

After that, the management server 30 transmits the section identification information and the position information that have been acquired from the shot image as described above, to the outside in association with each other (step S6). At this time, the management server 30 transmits the section identification information and the position information to a site where the vehicle 1A, 1B, 1D can travel so that at least the vehicle 1A, 1B, 1D can receive.

Subsequently, the respective vehicles 1A, 1B and 1D receive the mutually associated section identification information and position information having been transmitted from the management server 30 (step S7). Each of the vehicles 1A, 1B and 1D checks whether or not the transmitted section identification information matches the section identification information stored on the identification information storage part 12 of itself. Each of the vehicles 1A, 1B and 1D, in a case where the transmitted section identification information matches the section identification information stored by the vehicle itself, estimates the position information associated with the transmitted section identification information as the position of the vehicle itself (step S8).

Consequently, in the example of FIG. 3, the section identification information and position information relating to the vehicle 1A, the section identification information and position information relating to the vehicle 1B, and the section identification information and position information relating to the vehicle 1D are transmitted from the management server 30 into a target site. Therefore, each of the vehicles 1A, 1B and 1D receives not only the information relating to itself but also the information relating to the other vehicles. However, because the section identification information is included in the information transmitted from the management server 30, each of the vehicles 1A, 1B and 1D can specify the section identification information acquired due to location of the vehicle itself and stored by the vehicle itself from among the transmitted information and estimate only the position information associated with the specified section identification information as its own position. For example, the vehicle 1A receives the section identification information and position information of all the vehicles 1A, 1B and 1D from the management server 30, but the vehicle 1A can specify only the section identification information and position information relating to a section where the vehicle 1A itself is located, and can properly estimate its own position.

After that, each of the vehicles 1A, 1B and 1D may autonomously travel on a passage by using its own position having been estimated, or may notify an operator of its own position having been estimated.

According to the above-described information processing system, each of the vehicles 1A, 1B and 1D estimates its own position, so that there is no need to mount a camera, a sensor or the like on itself, and it is possible to reduce the equipment cost and more accurately specify its position.

Second Example Embodiment

Figure 5:
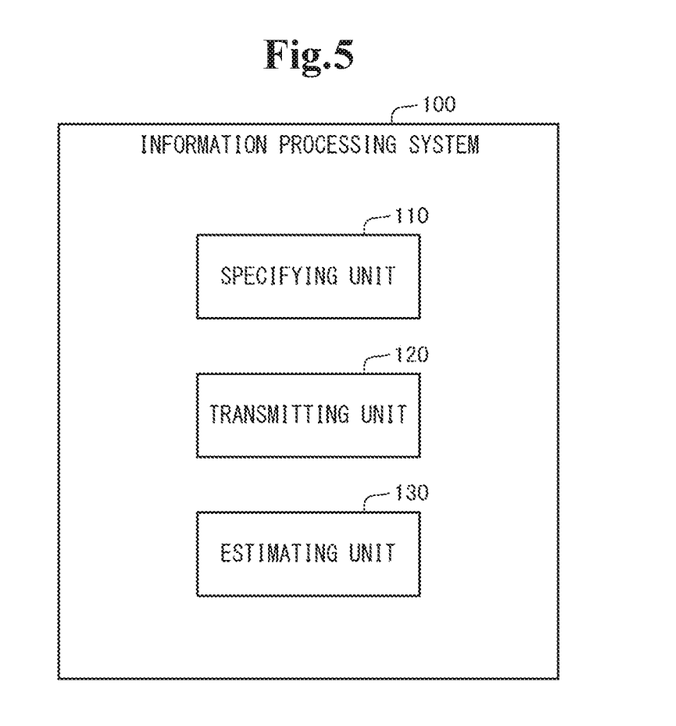
FIG. 5 is a block diagram showing the configuration of an information processing system in a second example embodiment of the present invention.
Figure 6:
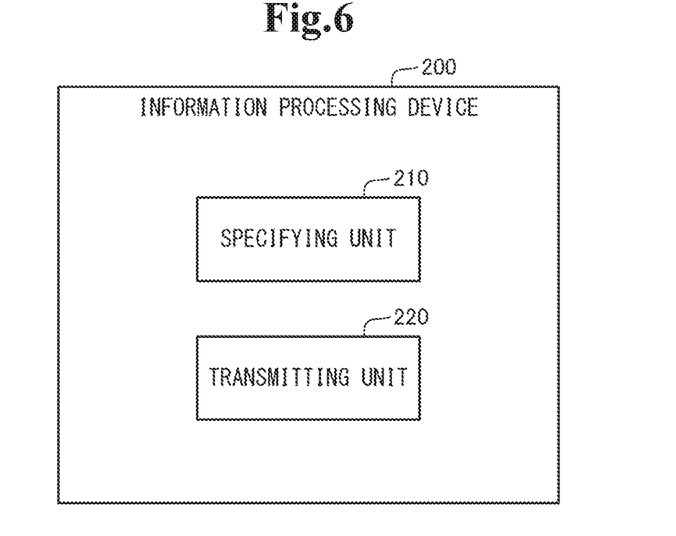
FIG. 6 is a block diagram showing the configuration of an information processing device in the second example embodiment of the present invention.

Next, a second example embodiment of the present invention will be described with reference to FIGS. 5 to 6. FIG. 5 is a block diagram showing the configuration of an information processing system in the second example embodiment. FIG. 6 is a block diagram showing the configuration of an information processing device in the second example embodiment. In this example embodiment, the configurations of the information processing system and the management server 30 described in the first example embodiment are schematically shown.

As shown in FIG. 5, an information processing system 100 in this example embodiment includes: a specifying unit 110 configured to specify, based on a shot image, position information representing a position of a moving object present in the shot image and identification information for identifying a section of an area where the moving object is located; and a transmitting unit 120 configured to transmit the position information and the identification information to outside in association with each other. The moving object includes an estimating unit 130 configured to estimate a position of the moving object based on the identification information and the position information that have been transmitted.

Further, as shown in FIG. 6, an information processing device 200 configuring part of the information processing system 100 includes: a specifying unit 210 configured to specify, based on a shot image, position information representing a position of a moving object present in the shot image and identification information for identifying a section of an area where the moving object is located; and a transmitting unit 220 configured to transmit the position information and the identification information to surroundings in association with each other so that the moving object can receive.

The respective units 110, 120, 130, 210 and 220 mentioned above may be built by execution of a program by an arithmetic logic unit, or may be built by an electronic circuit.

Then, in the information processing system 100 and the information processing device 200 having the above configurations: the information processing device operates so as to perform a process of, based on a shot image, specifying position information representing a position of a moving object present in the shot image and identification information for identifying a section of an area where the moving object is located, and transmitting the position information and the identification information to surroundings in association with each other; and the moving object operates so as to perform a process of estimating a position of the moving object based on the identification information and the position information that have been transmitted.

With the above configurations, a moving object does not need to be equipped with a camera, a sensor or the like for estimating the position of the moving object itself, so that it is possible to reduce the equipment cost and more accurately specify the position of the moving object itself.

Supplementary Notes

The whole or part of the example embodiments disclosed above can be described as the following supplementary notes. The configurations of an information processing system, an information processing device, a program and an information processing method according to the present invention will be schematically described below. However, the present invention is not limited to the following configurations.

(Supplementary Note 1)

An information processing system comprising:
  a specifying unit configured to specify, based on a shot image, position information representing a position of a moving object present in the shot image and identification information for identifying a section of an area where the moving object is located; and
  a transmitting unit configured to transmit the position information and the identification information to outside in association with each other,
  wherein the moving object includes an estimating unit configured to estimate a position of the moving object based on the identification information and the position information that have been transmitted.

(Supplementary Note 2)

The information processing system according to Supplementary Note 1, wherein:
  the moving object includes an identification information acquiring unit configured to acquire the identification information of the section where the moving object is located; and
  the estimating unit is configured to estimate a position of the moving object based on the identification information that has been acquired and the identification information and the position information that have been transmitted.

(Supplementary Note 3)

The information processing system according to Supplementary Note 2, wherein the estimating unit is configured to, in a case where the acquired identification information is identical to the transmitted identification information, estimate a position of the moving object based on the position information associated with the transmitted identification information.

(Supplementary Note 4)

The information processing system according to Supplementary Note 2 or 3, wherein the identification information acquiring unit is configured to acquire the identification information of the section from an object placed in the section.

(Supplementary Note 5)

The information processing system according to Supplementary Note 4, wherein the specifying unit is configured to, based on the shot image, specify the identification information of the section from an image portion of an object placed in the section.

(Supplementary Note 6)

An information processing device comprising:
   a specifying unit configured to specify, based on a shot image, position information representing a position of a moving object present in the shot image and identification information for identifying a section of an area where the moving object is located; and
   a transmitting unit configured to transmit the position information and the identification information to surroundings in association with each other so that the moving object can receive.

(Supplementary Note 7)

A non-transitory computer-readable medium for storing a program comprising instructions for causing an information processing device to realize:
   a specifying unit configured to specify, based on a shot image, position information representing a position of a moving object present in the shot image and identification information for identifying a section of an area where the moving object is located; and
   a transmitting unit configured to transmit the position information and the identification information to surroundings in association with each other so that the moving object can receive.

(Supplementary Note 8)

An information processing method comprising:
   in an information processing device, based on a shot image, specifying position information representing a position of a moving object present in the shot image and identification information for identifying a section of an area where the moving object is located, and transmitting the position information and the identification information to surroundings in association with each other; and
   in the moving object, estimating a position of the moving object based on the identification information and the position information that have been transmitted.

(Supplementary Note 9)

The information processing method according to Supplementary Note 8, wherein:
   the moving object acquires the identification information of the section where the moving object is located; and
   the moving object estimates a position of the moving object based on the identification information that has been acquired and the identification information and the position information that have been transmitted.

(Supplementary Note 10)

The information processing method according to Supplementary Note 9, wherein in a case where the acquired identification information is identical to the transmitted identification information, the moving object estimates a position of the moving object based on the position information associated with the transmitted identification information.

The abovementioned program is stored in a storage unit or recorded on a computer-readable recording medium. For example, the recording medium is a portable medium such as a flexible disk, an optical disk, a magneto-optical disk and a semiconductor memory.

Although the present invention has been described above with reference to the example embodiments and so on, the present invention is not limited to the above example embodiments. The configurations and details of the present invention can be changed in various manners that can be understood by one skilled in the art within the scope of the present invention.

EXPLANATION OF REFERENCE NUMERALS 1, 1A, 1B, 1D vehicle
1a, 1b, 1d reader
10 vehicle terminal
11 estimating part
12 identification information storage part
20 camera
30 management server
31 acquiring part
32 specifying part
33 transmitting part
34 passage information storage part
100 information processing system
110 specifying unit
120 transmitting unit
130 estimating unit
200 information processing device
210 specifying unit
220 transmitting unit
RA, RB, RC, RD section
TA, TB, TC, TD tag

The invention claimed is:

1. An information processing system comprising:
   a specifying unit configured to specify, based on a shot image, position information representing a position of a moving object present in the shot image and identification information for identifying a section of an area where the moving object is located; and
   a transmitting unit configured to transmit the position information and the identification information to outside in association with each other,
   wherein the moving object includes an estimating unit configured to estimate a position of the moving object based on the identification information and the position information that have been transmitted.

2. The information processing system according to claim 1, wherein:
   the moving object includes an identification information acquiring unit configured to acquire the identification information of the section where the moving object is located; and
   the estimating unit is configured to estimate a position of the moving object based on the identification information that has been acquired and the identification information and the position information that have been transmitted.

3. The information processing system according to claim 2, wherein the estimating unit is configured to, in a case where the acquired identification information is identical to the transmitted identification information, estimate a position of the moving object based on the position information associated with the transmitted identification information.

4. The information processing system according to claim 2, wherein the identification information acquiring unit is configured to acquire the identification information of the section from an object placed in the section.

5. The information processing system according to claim 4, wherein the specifying unit is configured to, based on the shot image, specify the identification information of the section from an image portion of an object placed in the section.

6. An information processing device comprising:
a specifying unit configured to specify, based on a shot image, position information representing a position of a moving object present in the shot image and identification information for identifying a section of an area where the moving object is located; and
a transmitting unit configured to transmit the position information and the identification information to surroundings in association with each other so that the moving object can receive.

7. An information processing method comprising:
in an information processing device, based on a shot image, specifying position information representing a position of a moving object present in the shot image and identification information for identifying a section of an area where the moving object is located, and transmitting the position information and the identification information to surroundings in association with each other; and
in the moving object, estimating a position of the moving object based on the identification information and the position information that have been transmitted.

8. The information processing method according to claim 7, wherein:
the moving object acquires the identification information of the section where the moving object is located; and
the moving object estimates a position of the moving object based on the identification information that has been acquired and the identification information and the position information that have been transmitted.

9. The information processing method according to claim 8, wherein in a case where the acquired identification information is identical to the transmitted identification information, the moving object estimates a position of the moving object based on the position information associated with the transmitted identification information.

10. The information processing method according to claim 8, wherein the moving object acquires the identification information of the section from an object placed in the section.

11. The information processing method according to claim 10, wherein the information processing device specifies the identification information of the section from an image portion of an object placed in the section, based on the shot image.

* * * * *